Figure 1:
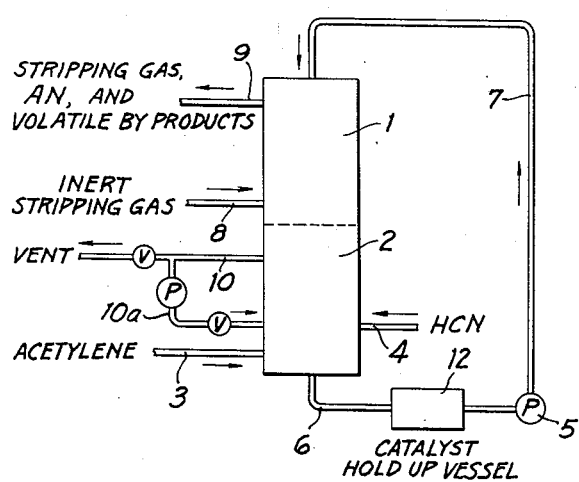

March 5, 1957

G. A. AKIN ET AL 2,784,214

PROCESS FOR MAKING ACRYLONITRILE

Filed Feb. 10, 1955

GEORGE A. AKIN
HOWARD S. YOUNG
INVENTORS

BY *Daniel J. Mayne,*
*Joe Allen Jones*
ATTORNEYS

2,784,214

PROCESS FOR MAKING ACRYLONITRILE

George A. Akin and Howard S. Young, Kingsport, Tenn., assignors to Eastman Kodak Company, Rochester, N. Y., a corporation of New Jersey Application February 10, 1955, Serial No. 487,342

7 Claims. (Cl. 260—465.3)

This invention relates to the manufacture of acrylonitrile from acetylene and hydrogen cyanide in the presence of cuprous chloride solutions as catalysts. Specifically this invention relates to a process for manufacturing acrylonitrile at a lower cost than is possible with the processes hitherto disclosed. This is achieved by using an inert gas to strip the acrylonitrile from the catalyst solution in which it is formed instead of using the excess acetylene which is normally used and recycled, and which requires purification to maintain high yields and high product purity. According to our invention, substantially only the amount of acetylene needed for reaction with the HCN is fed to the reactor. Various inert gases may be used, as will be discussed below.

The production of acrylonitrile from acetylene and hydrogen cyanide is described in U. S. Patent Re. 23,265. According to this patent it is advantageous to feed to the reactor about ten times as much acetylene as hydrogen cyanide. The unreacted acetylene sweeps the acrylonitrile and other products from the reactor. According to U. S. Patent 2,324,854 the vapors escaping from the reactor may be separated by washing with water to recover their content of acrylonitrile. The acetylene may be purified and conveyed back to the reactor with the addition of fresh make-up acetylene.

In BIOS Report No. 1057 it is reported that several byproducts are produced. Among those which have been identified are vinyl and divinyl acetylene, chloroprene, cyanobutadiene, acetaldehyde, and lactonitrile. It is stated that interactions between these products and the formation of tars and other insoluble and nonvolatile products result in the short catalyst life of approximately thirty days. The water-soluble byproducts make the recovery of pure acrylonitrile difficult.

U. S. Patent 2,385,327 describes a procedure according to which the acrylonitrile is recovered by continuously removing part of the catalyst from the reactor into a special apparatus. In this apparatus the acrylonitrile produced is recovered from the catalyst solution by heating, after which the liquid is returned to the reactor.

German Patent 859,448 describes a process in which the catalyst is circulated, and at a fixed point in the cycle hydrogen cyanide is introduced, while at another point excess acetylene is blown through the reactor so that acrylonitrile leaves the catalyst solution with the undissolved excess acetylene at a point further along the cycle.

We have found that it is of great advantage to eliminate the large excesses of acetylene commonly used in the prior art to strip the acrylonitrile product from the catalyst solution, using instead, inert gas such as natural gas, oxidation reaction off gas, flue gas or the products of an Andrussow reactor after removal of ammonia.

This invention has as an object the production of acrylonitrile more cheaply than the prior processes. This is accomplished by using an inert stripping gas to remove acrylonitrile, thus eliminating the necessity of circulating large excessive volumes of acetylene through the system to remove the acrylonitrile, with the accompanying requirement for purification of the acetylene, which is a costly operation. Savings are accomplished by improving the acetylene yields, and also to a lesser extent the hydrogen cyanide yields, by allowing only the required amount of acetylene to come in contact with the catalyst which is known to be a powerful polymerizing agent for acetylene under certain conditions. Also advantageous is the accompanying reduction in the formation of tars and other nonvolatile products which tend to plug the reactor, to cause foaming, and according to many authorities, to shorten the life of the catalyst.

Another object is to improve the safety of the process by eliminating the handling of the large quantities of acetylene which is known to be a very dangerous gas. Still another object is to provide a process which is subject to better control than the processes in which excessive acetylene is used. Another object is to eliminate any heating of the catalyst solution above its normal operating temperature which tends to increase the amount of polymerization of the acrylonitrile and various byproducts formed in the reaction.

The present invention also has as an object to provide a process for producing acrylonitrile directly from the dilute hydrogen cyanide produced by an Andrussow reactor, using the other gases present in the Andrussow reactor products, after removal of ammonia, as the inert stripping gas instead of the large excesses of acetylene formerly used. Another object is to provide a process for production of an acrylonitrile product which can be purified more readily than the product of heretofore known processes. Another object is to integrate the production of hydrogen cyanide with that of acrylonitrile so that hydrogen cyanide is consumed as it is produced, thus avoiding the need to concentrate and store this highly poisonous material.

Figure 2:
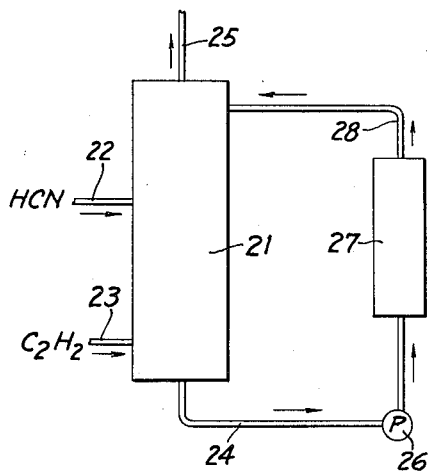
Figure 3:
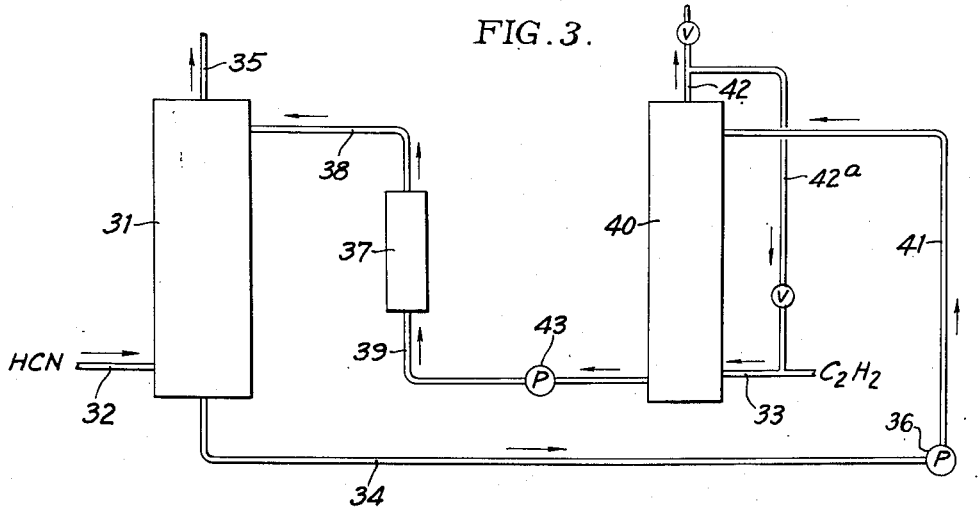

The above and other objects of the invention will be apparent from the following specification when read in conjunction with the appended drawing, in which:

Fig. 1 is a diagrammatic view showing operation of the invention according to a first embodiment;

Fig. 2 is a diagrammatic view showing operation according to another embodiment in which the stripping gas accompanies the HCN, as for example when the off gas from an Andrussow-type HCN producer, after removal of ammonia, is used as the stripping gas; and Fig. 3 is a diagrammatic view showing operation according to a third embodiment of the invention operating similar to that of Fig. 2, except that the reactor is formed as two columns connected together, HCN being fed to one and acetylene to the other, thus permitting use of a lower total pressure on the acetylene gas stream.

Referring now to Fig. 1, there is shown a reactor 2 provided with means (not shown) for maintaining the catalyst solution therein at 75–100° C. The catalyst is circulated through reactor 2, which may be a packed column with the catalyst running down over the packing, or a liquid-filled reactor through which the reacting gas bubbles, or it may be a column containing suitable gas dispersing plates. The catalyst, charged with acetylene and hydrogen cyanide which react to form acrylonitrile, leaves the reactor 2 by means of pipe 6 which feeds pump 5. The catalyst is forced through pipe 7 to stripping column 1. In column 1 the catalyst is intimately contacted with a stripping gas which is fed to the column by line 8 and discharges containing the acrylonitrile and volatile byproducts by line 9. The stripping gas used here may be any gas which is inert to the catalyst and does not react with acrylonitrile. Nitrogen is a suitable material and is frequently available as a byproduct waste gas in chemical plants. The gas used should not contain appreciable quantities of oxygen since the catalyst will become oxidized with loss in activity and poorer product yields. Acrylonitrile will, of course, be recovered by known means from the gas in line 9. The catalyst leaving column 1 continues its flow to the reactor 2 where it is contacted with acetylene and hydrogen cyanide in the correct proportions for optimum results. The acetylene and hydrogen cyanide may be fed to the reactor through separate lines 3 and 4, or they may be mixed and fed through a common line. It may be preferable to feed the hydrogen cyanide through a line somewhat higher in the reactor in order that a slight excess of hydrogen cyanide can be maintained in the catalyst at all times. This helps keep the acetylene from forming undesirable byproducts.

In some cases, it is desirable to install a catalyst holdup vessel 12 in line 6 to allow the reaction to become more nearly complete before the catalyst is pumped to the stripper. This will reduce the loss of acetylene and hydrogen cyanide with the stripping gas through line 9.

Recovery of acrylonitrile will normally be accomplished by scrubbing the stripper off gas from line 9 with water or another suitable solvent and subsequent distillation of the scrubber solution. We have found that this scrubbing also recovers some of the byproducts and a part of the hydrogen cyanide. The hydrogen cyanide recovered in this manner is easily recycled back to the reactor avoiding the loss of hydrogen cyanide that would otherwise occur. This recycle becomes especially important when an excess of hydrogen cyanide is maintained in the catalyst solution.

It is entirely possible that with some reactor designs it will be impossible to absorb all of the acetylene fed into reactor 2 in a single pass. In any case it will be desirable to install a vent line 10 from the reactor to allow purging small amounts of gases which seem to develop in the reactor. If these gases contain an appreciable quantity of desirable reaction materials (acetylene and hydrogen cyanide) they may be partly recycled to the reactor through line 10a, or recovered from the purge gas and recycled as purified acetylene and hydrogen cyanide.

When reactor 2 is designed for relatively complete absorption of the feed acetylene and hydrogen cyanide, the stripping section 1 may be a continuation of the reactor 2 in which case line 10 will not be necessary, and the broken line indicating separation between reactor 2 and stripper 1 will not apply.

Certain outstanding advantages are apparent when the production of acrylonitrile is carried out by this new process. The fact that our process does not need to be operated with an excess of acetylene gives rise to a great decrease in the production of byproducts of acetylene, and consequently of hydrogen cyanide. It may be mentioned here that it is desirable to operate the process according to Fig. 1 in such a manner that all of the catalyst which acetylene contacts contains hydrogen cyanide in a form available for reaction. To assure this, the catalyst leaving the reactor should contain a certain proportion of unreacted hydrogen cyanide.

Another outstanding advantage of the process is the high purity of the acrylonitrile produced. As a result of this improvement in crude product purity, the purification equipment necessary for obtaining high quality pure product is greatly reduced in size and complexity.

Acetylene is known to be a hazardous material, particularly when handled under pressure for chemical processing. It is an outstanding contribution to the safety of the process of producing acrylonitrile that the quantity of acetylene handled is reduced by this method of operation to only a small fraction of that usually required.

Another advantage of the process, which is a direct result of the reduction of byproducts and tars, is the improved yield of acrylonitrile. These improvements are illustrated in the following examples:

Example 1

A catalyst containing 42.7 percent cuprous chloride, 26.3 percent potassium chloride, and 31 percent water was charged to a reactor as illustrated in Figure 1. Pure acetylene and hydrogen cyanide were fed at 3 and 4 at the bottom of a liquid-filled reactor 2 at rates of 6.50 and 6.40 grams per liter of catalyst in the reactor per hour, respectively. The catalyst at a temperature of 85° C. circulated from the bottom of reactor 2 to the top of stripping tower 1 at such a rate that its residence time in the reactor averaged 20 minutes. Natural gas was fed to the stripper through line 8 at a rate of 71 liters per hour per liter of catalyst in the reactor. The gas stream which issued from the stripper through line 9 was analyzed and found to contain the following reaction products: acrylonitrile, acetaldehyde, lactonitrile, vinyl chloride, and vinyl acetylene. For each liter of catalyst in the reactor, the gas stream which issued through line 9 was found to contain, on the average, the following quantities of reaction products per hour, over a period of ten days' operation.

| Component | Amount, grams | Yield Based on HCN, percent | Yield Based on $C_2H_2$, percent |
|---|---|---|---|
| acrylonitrile | 12.0 | 95.5 | 90.8 |
| acetaldehyde | 0.48 | | 4.4 |
| lactonitrile | 0.31 | 1.8 | 1.8 |
| vinyl chloride | 0.11 | | 0.7 |
| vinyl acetylene | 0.013 | | 0.2 |

Cyanobutadiene could not be detected.

The catalyst contained only a small amount of tars after ten days' operation.

Example 2

To a fresh catalyst in the reactor described in Example 1 were added pure acetylene and hydrogen cyanide at feed points 3 and 4 at rates of 6.50 grams per liter of catalyst in the reactor per hour for both streams. The catalyst at a temperature of 85° C. was circulated from the bottom of the reactor 2 to the top of the stripping tower 1 at such a rate that its residence time in the reactor averaged 20 minutes. An oxidation reaction off gas containing 96.3% nitrogen, 3.3% $CO_2$, and 0.4% oxygen was fed to the stripper through line 8 at a rate of 75 liters per hour per liter of catalyst in the reactor. The gas stream which issued from the stripper through line 9 was analyzed and found to contain the following reaction products. Acrylonitrile, lactonitrile, acetaldehyde, vinyl chloride, and vinyl acetylene. For each liter of catalyst in the reactor, the gas stream which issued through line 9 was found to contain quantities of reaction products per hour, over a period of 15 days' operation, to give the following yields.

| Component | Based on HCN, percent | Yield Based on $C_2H_2$ percent |
|---|---|---|
| acrylonitrile | 92.5 | 89.2 |
| acetaldehyde | | 3.2 |
| lactonitrile | 1.4 | 1.4 |
| vinyl chloride | | 0.8 |
| vinyl acetylene | | 0.3 |

During this run the catalyst had a brown color and some tar was formed.

Example 3

To a fresh catalyst in the reactor described in Example 1 were added pure acetylene and hydrogen cyanide at feed points 3 and 4 at rates of 20.0 and 6.40 grams per liter of catalyst in the reactor per hour. This is very much less acetylene than is described in U. S. Re. 23,265, but is obviously considerably more than is used in the other examples hereof. The catalyst at a temperature of 85° C. was circulated from the bottom of reactor 2 to the top of stripping tower 1 at such a rate that the residence time in the reactor averaged 20 minutes. Natural gas was fed to the stripper through line 8 at a rate of 71 liters per hour per liter of catalyst in the reactor. The gas stream which issued from the stripper through line 9 was analyzed and found to contain the following reaction products: acrylonitrile, acetaldehyde, lactonitrile, vinyl chloride, vinyl acetylene, cyanobutadiene, chloroprene, and divinyl acetylene. For each liter of catalyst in the reactor the gas stream which issued from line 9 was found to contain, on the average, the following quantities of reaction products per hour over a period of four days' operation.

| Component | Amount, grams | Yield Based on HCN, percent | Yield Based on $C_2H_2$, percent |
|---|---|---|---|
| acrylonitrile | 10.9 | 86.8 | 26.7 |
| acetaldehyde | 0.86 | | 2.5 |
| lactonitrile | 0.40 | 2.4 | 0.7 |
| vinyl chloride | 0.33 | | 0.7 |
| vinyl acetylene | 2.73 | | 13.6 |
| cyanobutadiene | 1.12 | 6.0 | 3.7 |
| divinyl acetylene | 0.17 | | 0.8 |
| chloroprene | 0.06 | | 0.2 |

This stream also contained an amount of acetylene corresponding to 47.3 percent of that fed to the reactor through line 3, and also traces of hydrogen cyanide. The catalyst after four days' operation was rather dirty with tars floating on the surface. The packing in the stripper 1 also showed signs of becoming plugged with tar.

*Example 4*

Example 2 was repeated using, however, a flue gas containing on the average about 10% carbon dioxide, 2% oxygen, and 88% nitrogen with traces of other constituents as a stripping gas for the acrylonitrile. This gas which issued from the stripper 1 at line 9 was found to contain the following reaction products in the amounts to give the yields indicated from acetylene and hydrogen cyanide over an eight-day period.

| Component | Yield Based on HCN, percent | Yield Based on $C_2H_2$, percent |
|---|---|---|
| acrylonitrile | 79.6 | 76.3 |
| acetaldehyde | | 1.7 |
| acetic acid | | 1.2 |
| vinyl chloride | | 0.4 |
| vinyl acetylene | | 0.7 |
| lactonitrile | 0.3 | 0.3 |

The catalyst during this run had a very dark brown color and large quantities of tars were formed. The stripping gas leaving the reactor was analyzed for oxygen and found to contain less than 0.5% in all cases.

It should be pointed out that all of the possible methods of operation of the process according to Fig. 1 cannot be given in the examples. For example, variations in stripping gas flow will have a large effect on the amount of acrylonitrile remaining in the catalyst solution as it leaves the stripper 1. This acrylonitrile, recycled to the reactor, is considered to have an undesirable effect on the process and the amount should be kept reasonably low.

The inert gas used for stripping tends to lower the catalyst temperature. For this reason, the stripper used in our experiments was heated. It would be possible, however, to operate the process by providing the necessary heat to the stripping gas to prevent lowering of the catalyst temperature. In certain installations, it is desirable to provide part of the necessary heat by heating the liquid and part by heating the stripping gas.

In the examples described above, the catalyst was maintained at the proper density by the periodic addition of water to the reactor 2. The loss of water from the catalyst solution can be controlled by humidifying the stripping gas so that its moisture content entering stripper 1 is the same as when it leaves by line 9.

It had been assumed that in the prior art production of acrylonitrile, the excess of acetylene was used because of its relatively lower solubility than hydrogen cyanide in the catalyst solution. It has been found, however, that when relatively pure acetylene is used this is not the case, and actually, when proper contacting of acetylene with the catalyst is accomplished, no difficulty is encountered in absorbing essentially all of the feed acetylene when its feed rate is held down to that indicated in Examples 1, 2, and 4. While it may be possible that with higher acetylene flows somewhat larger production rates could be achieved, the loss of the advantages of using inert gas scrubbing would not make this desirable. On the other hand, in any cases in which higher production rates can be achieved by higher acetylene feed rates, the excess actylene can always be removed at line 10 as indicated above and recycled, with purification if necessary.

The modifications shown in Figs. 2 and 3 relate to a process in which a mixture of hydrogen cyanide and other gases issuing from an Andrussow-type hydrogen cyanide producer is fed after suitable treatment to a reactor in which the hydrogen cyanide combines with acetylene, which is introduced separately. The acrylonitrile produced is swept from the reactor by the remaining components of the gas from the Andrussow-type reactor.

These modifications also provide considerable advantages over the prior art referred to above, and in regard to U. S. 2,385,327, our use of the undissolved components of the Andrussow off gas is much more economical than the use of heat or steam to drive acrylonitrile from the catalyst. Also, heating the catalyst above its normal operating temperature speeds up hydrolysis of hydrogen cyanide and cuprous cyanide which it contains, and thereby produces unwanted ammonium formate in the catalyst at a rate faster than normal.

In the common form of acrylonitrile reactor tower a side tube is attached to a tower to cause circulation of stripped catalyst from the top of the tower to the bottom of the tower where it contacts the incoming feeds of hydrogen cyanide and excess acetylene. An even more elaborate cyclic operation with the catalyst is described in German Patent 859,448, and a related operation is shown in U. S. Patent 2,692,276. According to this patent the catalyst is circulated, and at a fixed point in the cycle hydrogen cyanide is introduced, and at another point in the cycle excess acetylene is blown through the catalyst so that acrylonitrile leaves the catalyst solution with undissolved acetylene at a point further along in the cycle. Then the catalyst solution charged with acetylene goes back to the hydrogen cyanide feed point to complete the cycle. A principal disadvantage of such operation is that, compared to the hydrogen cyanide which it receives, the catalyst receives an enormous amount of acetylene which it can proceed to convert to undesirable byproducts such as vinyl acetylenes, acetaldehyde, vinyl chloride, lactonitrile, and the like. This disadvantage is noted in the German patent, and it is suggested that the equipment be designed so as to minimize the duration of contact between acetylene and catalyst of low hydrogen cyanide content. Our process, on the other hand, does not require an excess of acetylene, since we do not use acetylene as a stripping agent.

The hydrogen cyanide required for manufacture of acrylonitrile is commonly vaporized from a feed tank and is added to the reactor either at or near the point of entry of acetylene. This hydrogen cyanide can be produced by the Andrussow process which is disclosed in U. S. Patent 1,934,838. In this process a gaseous mixture of ammonia, a vaporous hydrocarbon, and oxygen is passed over fine-meshed wire nets of a platnium alloy at about 1000° C. After the removal of unreacted ammonia from the gas produced by the Andrussow process, the dilute hydrogen cyanide is recovered from the gas. This may be accomplished by cooling the gas or by washing it with a suitable solvent, from which the hydrogen cyanide is subsequently separated by distillation. The hydrogen cyanide is then stabilized against polymerization, and is stored to await use.

In the process of Figs. 2 and 3, the Andrussow reactor off gas which has been treated for removal of ammonia is fed directly to a column of our reactor. An example of its composition is stated in Example 5. The reactor is charged with catalyst solution which contains cuprous chloride and other salts and which may contain hydrochloric acid. This catalyst solution flows countercurrently to the gas and absorbs the hydrogen cyanide from the gas. The bulk of the gas remains undissolved and passes up the column to another stage of the reactor. The catalyst solution which has picked up hydrogen cyanide then flows countercurrently to a rising stream of acetylene in a column. From the bottom of this column it is then pumped to a holdup container, if desired, and then goes to the top of a column up which the undissolved components of the Andrussow gas are rising. This gas strips the acrylonitrile from the catalyst and carries it to recovery equipment. The stripped catalyst then passes to the stage of the reactor in which it picks up hydrogen cyanide from the treated Andrussow reactor off gas to complete its cycle.

Referring now to Figs. 2 and 3, it should be understood that the reactors are designed so that the catalyst solution can be held at temperatures between 75 and 100° C. in all parts of them.

In Fig. 2, the reactor tower 21, down which the catalyst solution moves, may be an open column or it may be packed with saddles, or may contain suitable gas dispersing plates. The catalyst passes out of the bottom of the tower into line 24 and is forced by pump 26 to flow through optional chamber 27 and line 28 back to a point near the top of the tower. The off gas from an Andrussow reactor is treated to remove ammonia and is fed to the reactor through line 22. As this gas passes up the tower the downward flowing catalyst absorbs hydrogen cyanide from it and carries the hydrogen cyanide into the portion of the reactor below line 22.

Acetylene is fed to the reactor through line 23 and rises against the downcoming catalyst which has been charged with hydrogen cyanide. If desired, the rate of feed of this acetylene can be adjusted so that no acetylene gas rises as high as line 22. The catalyst which has now been charged with both hydrogen cyanide and acetylene is transferred by means of line 24 and pump 26 to the optional holdup chamber 27. This chamber may be in the form of a tower fitted with internal baffle plates to reduce mixing between its inlet and outlet streams. It can also be made in the form of a long spiral.

Line 28 serves to conduct the catalyst to the top of the reactor where it meets the upcoming stream of Andrussow off gas from which substantially all of the hydrogen cyanide has been removed. This gas then strips acrylonitrile from the catalyst as the catalyst flows back down the column to start the process over again by absorbing hydrogen cyanide from the gas entering through line 22. The gas leaves the reactor through line 25. If desired, provisions may be made for cooling this gas in a reflux condenser and permitting some or all of the water layer of the condensate to return to the reactor. The gas can then be conducted to equipment in which its content of acrylonitrile is scrubbed out in an inert liquid such as water.

Referring now to Fig. 3, we have found that especially when working with undiluted acetylene in liquid-filled reactors it may be advantageous to build the reactor as two columns, with one of the gas streams fed to the bottom of each tower, and with the gas exits at the tops of the reactors connected together if desired. By this means the total pressure on the acetylene gas stream can be lower than if only one tower were used. It may be desired to keep this pressure lower than about 1.4 atm. absolute for pure acetylene, in order to be certain of the safety of the unit. If the gas exit from the reactor is at one atmosphere, the pressure contributed by the catalyst should in this case be no more than about 0.4 atm. at the acetylene entrance. With a catalyst of density 1.7 g. per ml. the height of the column of the catalyst which would exert 0.4 atm. would be about 8 feet. In Figure 3 is shown a reactor in which this entire 8 feet of catalyst height would be used for absorption of acetylene.

In Fig. 3, the treated Andrussow reactor off gas is fed to tower 31 through line 32. Catalyst containing hydrogen cyanide leaves this tower through line 34 and passes through pump 36 and line 41 to a point near the top of tower 40. The catalyst flows down this tower countercurrently to a stream of acetylene which is introduced through line 33. From the bottom of tower 40 the catalyst is forced by pump 43 through line 39, optional holdup chamber 37 anud lines 38 to the top of tower 31. The catalyst flows down this tower, first losing acrylonitrile and then picking up hydrogen cyanide. Lines 35 and 42 serve as gas exits from the towers. In general, when substantially pure acetylene is fed through line 33, we prefer to minimize the quantity of gas which leaves through line 42. The acetylene containing gas which leaves tower 40 through line 42 may be recycled through line 42a to line 33, or it may be first purified and recycled to line 33, or it may be combined with the gas leaving tower 31 through line 35.

Certain outstanding advantages are apparent when the production of acrylonitrile is carried out by the process of Figs. 2 and 3. One major cost savings is realized by the fact that it is not necessary to provide the expensive equipment usually required to recover hydrogen cyanide from the Andrussow off gas. In our process the catalyst solution serves to separate the hydrogen cyanide from the Andrussow reactor off gas which has been treated to remove ammonia. The hydrogen cyanide is used as it is produced; there is no expense for storing and stabilizing it. The fact that the process of Figs. 2 and 3, as in the case of Fig. 1, does not need to be operated with an excess of acetylene gives rise to a great decrease in the production of byproducts of acetylene, because for a given amount of acrylonitrile produced much less acetylene contacts the catalyst and has an opportunity to react to form byproducts. It may be mentioned here that we prefer to operate our process in such a manner that all of the catalyst which acetylene contacts contains hydrogen cyanide in a form which is available for reaction. To do this it is usually necessary to operate in such a manner that a certain proportion of the hydrogen cyanide fed to the reactor leaves the reactor unreacted. We can, in fact, operate with substantially more hydrogen cyanide than acetylene in the overall feeds to the reactor. This unreacted hydrogen cyanide is even more readily recovered from the effluent gas than is the acrylonitrile which is produced, and can be returned to the reactor.

A third area of cost savings accruing from the process of Figs. 1–3 arises because of the high purity of the acrylonitrile produced. This high purity means that the purification equipment does not have to be so elaborate as with the formerly known methods of operation. Another savings in purification equipment is effected because the equipment for removal of vinyl acetylenes from acetylene which is required in the previous process is not required in our process. As stated above, we prefer not to permit any acetylene to pass out of the reactor. However, when we do operate so that some does come out, it is of such purity that it can be fed back to the reactor without treatment.

Because little or no vinyl acetylene is present in our reactor virtually no cyanobutadienes are produced, so a principal source of loss of hydrogen cyanide is avoided. Consequently, the yield of acrylonitrile based on hydrogen cyanide consumed is improved over that observed in the customary process.

When operating by our new process the production of unwanted tars is decreased, because of the smaller amount of reactive byproducts such as higher acetylenes, chloroprene, vinyl chloride, cyanobutadienes, and the like produced. Thus, the expense of removing them from the reactor is decreased. Columns in the equipment used to recover and purify acrylonitrile also stay cleaner.

One surprising aspect of the process of Figs. 2 and 3 is that the carbon monoxide which is contained in the Andrussow reactor's off gas does not poison the catalyst. It is, of course, standard practice in gas analysis to use either acid or ammoniacal solutions of cuprous chloride to absorb carbon monoxide, probably by the reaction $Cu_2Cl_2 + 2CO = Cu_2Cl_2 \cdot 2CO$. Therefore, one might have expected that carbon monoxide would tie up the cuprous chloride in the catalyst and impair the activity of the catalyst. One of the following examples, however, shows that even when all of the components of the treated Andrussow off gas except the hydrogen cyanide are replaced by carbon monoxide, no adverse effect on the catalyst's activity was noted.

The following examples are illustrative of operation according to Figs. 2 and 3. In them, all liquid compositions are given as parts by weight.

Example 5

A catalyst prepared from 5961 parts of cuprous chloride, 3668 parts of potassium chloride, and 4323 parts of distilled water was charged to a reactor of the type shown in Fig. 3. The optional holdup chamber 37 was not used. An ammonia-free Andrussow reactor off gas which had a composition, on a dry basis, of 8.0% HCN, 12.0% $H_2$, 6.5% CO, 1.5% $CH_4$, 0.1% $O_2$, and 71.9% $N_2$ was fed to the reactor through line 32. The feed rate of this gas was such that 0.00978 part of hydrogen cyanide entered the catalyst each hour per part of cuprous chloride in the catalyst. The feed rate of acetylene through line 33 was adjusted so that one molecule of acetylene entered for each molecule of hydrogen cyanide that entered. The temperature of the catalyst was held at 85° C. as closely as possible. The time required for the catalyst to make one complete cycle around the reactor was adjusted to 17 minutes. The conversion to acrylonitrile of the hydrogen cyanide and acetylene fed amounted to 69%. Unconverted hydrogen cyanide was collected with the acrylonitrile. The unconverted acetylene was of high purity. The conversion of acetylene to monovinylacetylene or to vinyl chloride amounted to less than 0.1% each. No cyanobutadiene could be detected in the products of the reaction. The reactor remained almost free of tar during the run. The only byproducts which were formed in significant amounts were acetaldehyde and a trace of lactonitrile.

Example 6

With other conditions the same as in Example 5, the pumping rate of the catalyst was increased so that the cycle time was changed to 7 minutes. The conversions of hydrogen cyanide and acetylene to acrylonitrile dropped to 53%.

Example 7

With other conditions the same as in Example 5, the pumping rate of the catalyst was decreased so that the time required for a complete cycle of the catalyst around the reactor was 49 minutes. The conversions decreased to 36%.

Example 8

An artificially prepared gas mixture containing 8% hydrogen cyanide and 92% carbon monoxide was fed to the reactor. With the exception of this change, the conditions of Example 5 were duplicated. The conversion of the hydrogen cyanide and acetylene to acrylonitrile amounted to 70%, representing a slight increase over the value observed in Example 5.

Example 9

A reactor of the type shown in Fig. 3 in which the optional holdup chamber 37 was used was charged with a catalyst like the one of Example 5. The gas used contained 8% hydrogen cyanide and it was fed to the reactor at a rate such that 0.00628 part of hydrogen cyanide were fed to the reactor per hour per each part of cuprous chloride in the reactor. At a pumping rate such that the catalyst made one cycle of the reactor in 26 minutes the conversions of hydrogen cyanide and of acetylene to acrylonitrile were both 80%.

Example 10

A catalyst of the type described in Example 5 was charged to a pilot plant unit which was constructed in accordance with Fig. 3. The volume of the catalyst contained in the holdup chamber 37 was 50 gallons. It was believed that in this unit the predominant part of the reaction took place in this holdup chamber. The catalyst was maintained at a temperature as close to 85° C. as possible. In each 24-hour period of a run lasting thirty-five days, 120.9 lb. of acetylene was fed to the unit. In the same period, 125.5 lb. of hydrogen cyanide in a gas stream leaving the ammonia removal section of an Andrussow reactor was fed to the unit, and, on the average, 206.5 lb. of acrylonitrile was made by the unit per 24 hours. Thus, the average conversion of either reactant to acrylonitrile amounted to 83.8%. The average conversion of acetylene to acetaldehyde and lactonitrile combined, both valuable products, amounted to 13.0%. The average loss of acetylene in other products which were not desirable, such as vinylacetylene and tar, amounted to 2.0%, and the average loss of unchanged acetylene from the unit amounted to 1.2%. The hydrogen cyanide recovered as such and as lactonitrile from the effluent gas amounted to 15.4% of that fed, so that the hydrogen cyanide lost or in other byproducts amounted to less than 1% of that fed.

It is necessary in process of Figs. 2 and 3, as in any process which employs an aqueous solution as a catalyst, to keep a careful check on the water content of the catalyst. Unless it is specially removed, a substantial amount of water vapor enters the reactor with the Andrussow reactor's off gas; also, some may enter with the acetylene used, depending on the method by which it was prepared. A balance between this incoming water vapor and that leaving in the effluent gases must be kept to prevent concentrating or diluting the catalyst solution unduly.

No hard and fast rule can be given here about the optimum circulation rate of the catalyst in its cycle around the reactor, for we have found it to be a function of the particular catalyst used, of the activity level (or age) of this catalyst, and of the rates of feed of reactants to the catalyst. According to our experience, the optimum cycle times for the catalyst, depending on the noted variables, are in the range of 5 to 50 minutes. It may also vary with the size of the equipment used, and with the quality of gas dispersion obtained.

Although only potassium chloride was employed as a solubilizer for cuprous chloride in the catalysts described in the above examples, our invention is not restricted to the use of this solubilizer alone. We have obtained equally good results when using a mixture of sodium and potassium chlorides as the solubilizing agent, and ammonium chloride can also be used as the solubilizer.

It is not our intent, in fact, to limit our invention to the use of any particular liquid catalyst, as it is evident that our invention is not specifically related to the catalyst employed.

Other forms of gas-liquid contacting equipment can also be employed.

As indicated by Example 8, our invention is not limited to the use of ammonia-free Andrussow reactor off gas as its source of hydrogen cyanide, as other sources of dilute hydrogen cyanide may be used provided they do not also feed to the reactor chemicals which will poison the catalyst.

While we have referred to feeding products from an Andrussow-type HCN generator directly to the reaction in Figs. 2 and 3, they can also be used in Fig. 1 as the feed to line 4, thus decreasing the amount of inert gas needed to be fed into line 8. In Figs. 2 and 3, additional inert gas can be fed to the reactors by the same or different lines as are used to feed to the reactor the products of the Andrussow-type generator.

In Petroleum Processing, volume 7, Number 11, page 1638, the removal of ammonia from Andrussow off gas is discussed. A solution of sulfuric acid is used to extract the ammonia from this gas.

What we claim is:

1. In the process of producing acrylonitrile by reacting acetylene with HCN in contact with a copper halide catalyst solution at 75–100° C., the improvement which comprises establishing a cyclic system having a continuously circulating flow of copper halide catalyst solution therein, continuously adding HCN to said continuously circulating catalyst solution in an initial zone, said addition of HCN being at a rate and in an amount soluble in said catalyst solution, continuously adding acetylene in a second zone to said catalyst solution circulating from said initial zone and containing said HCN, said addition of acetylene being at a rate and in an amount sufficient for reaction with said HCN in said continuously circulating solution but insufficient to establish a stream of acetylene countercurrent to said continuously circulating solution, circulating the resulting catalyst solution to which both HCN and acetylene have been added through a substantial portion of said cyclic system from said second zone to a stripping zone, continuously passing an inert stripping gas through said circulating solution in said stripping zone countercurrent to the flow of said circulating solution, and continuously removing said stripping gas, containing acrylonitrile, from said cyclic system after passage through said stripping zone.

2. The process according to claim 1 wherein the inert gas contains a substantial quantity of carbon monoxide.

3. The process according to claim 1 wherein the inert gas and the HCN are introduced into the cyclic system in admixture.

4. The process according to claim 1 wherein the HCN, inert gas and acetylene are introduced into the cyclic system at different zones, the zone of introduction of the inert gas being downstream from the zone of introduction of the acetylene and upstream from the zone of introduction of the HCN.

5. The process according to claim 1 wherein the HCN and inert gas are introduced in admixture upstream from the zone of introduction of acetylene and wherein the mixture of HCN and inert gas is the mixture obtained from the catalytic reaction of ammonia, a hydrocarbon and oxygen followed by removal of ammonia therefrom.

6. The process according to claim 1 wherein the inert gas contains a substantial proportion of nitrogen.

7. The process according to claim 1 wherein the catalyst solution comprises cuprous chloride in water.

References Cited in the file of this patent
UNITED STATES PATENTS

| | | |
|---|---|---|
| 2,502,678 | Spaulding et al. | Apr. 4, 1950 |
| 2,526,676 | Lovett | Oct. 24, 1950 |
| 2,692,276 | Goerg et al. | Oct. 19, 1954 |
| 2,709,177 | Porret | May 24, 1955 |